July 13, 1943.   H. S. HIROSHIMA   2,323,995
SPREADER
Filed Nov. 25, 1940   4 Sheets-Sheet 1
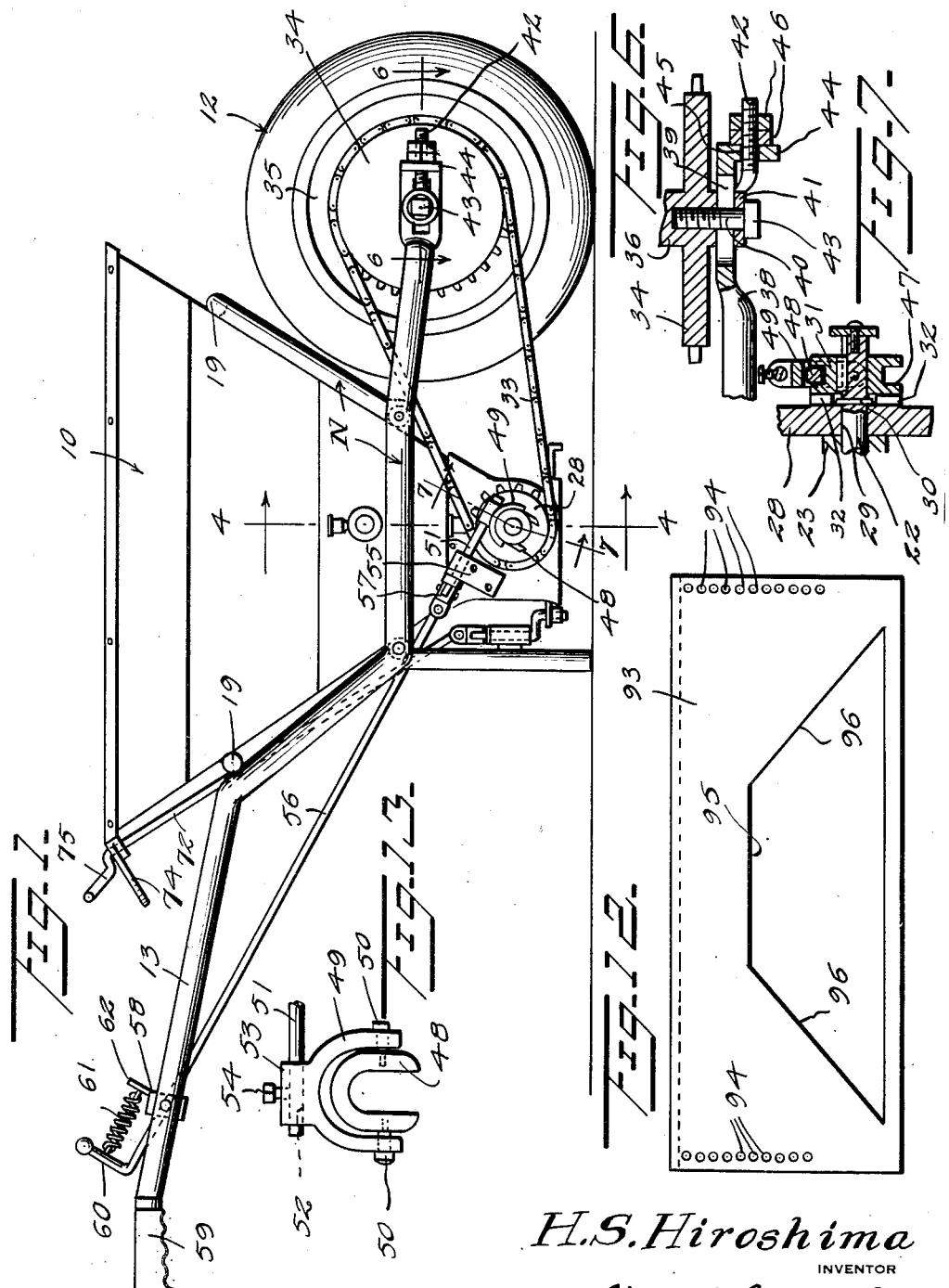
H.S. Hiroshima
INVENTOR
BY Victor J. Evans & Co.
ATTORNEYS July 13, 1943.  H. S. HIROSHIMA  2,323,995
SPREADER
Filed Nov. 25, 1940  4 Sheets-Sheet 2
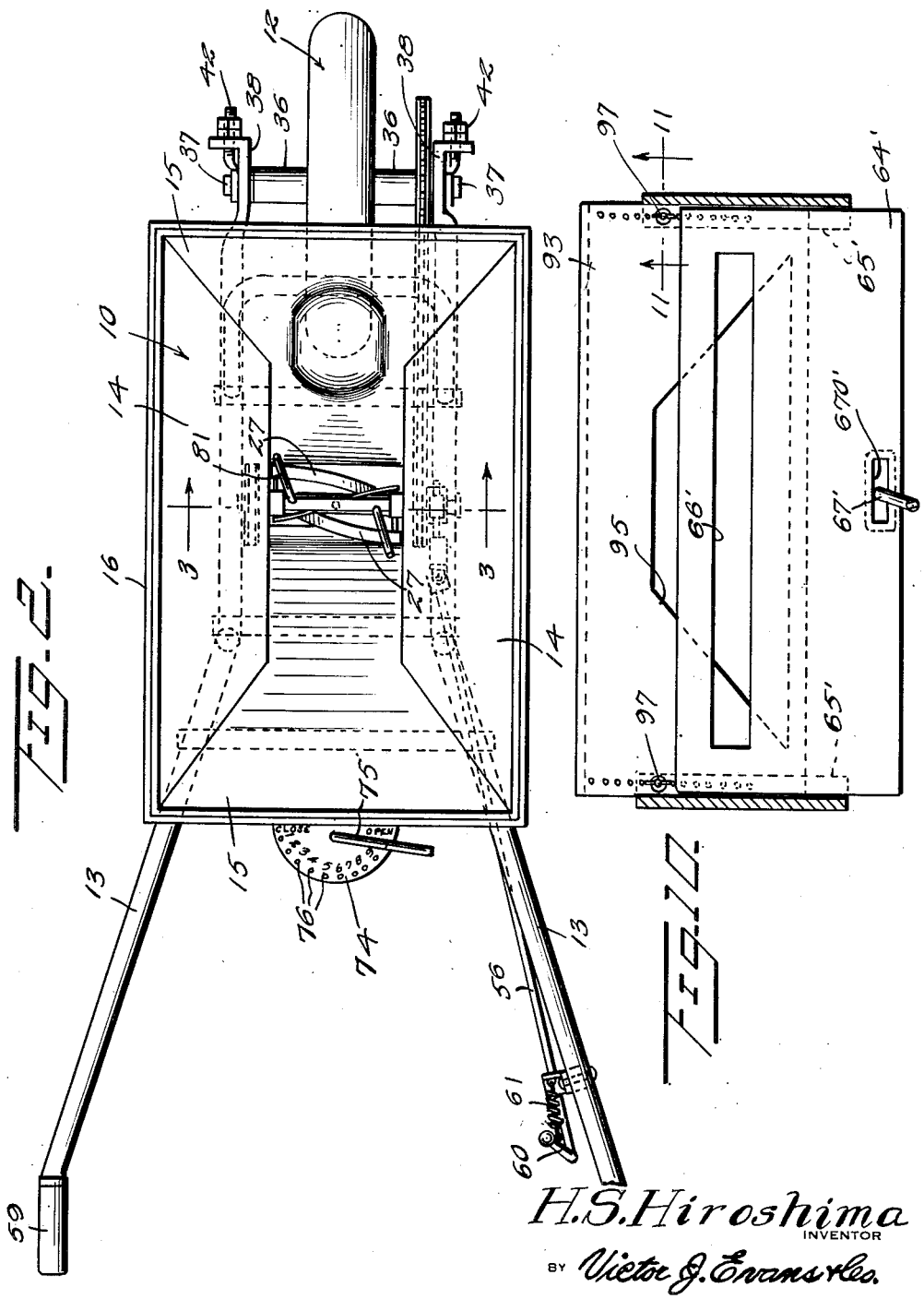

July 13, 1943.     H. S. HIROSHIMA     2,323,995
SPREADER
Filed Nov. 25, 1940     4 Sheets-Sheet 3
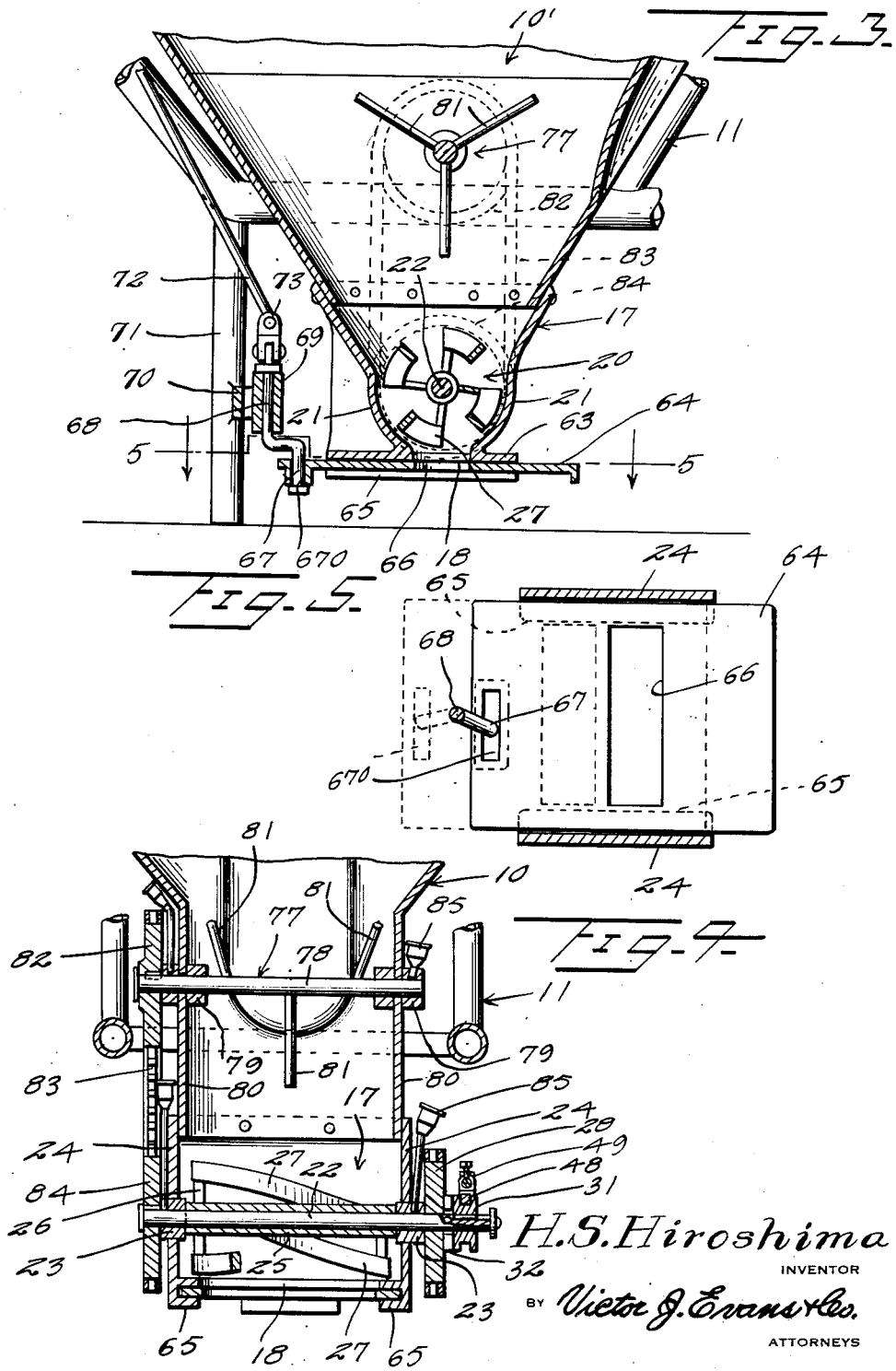
H. S. Hiroshima
INVENTOR
BY Victor J. Evans & Co.
ATTORNEYS

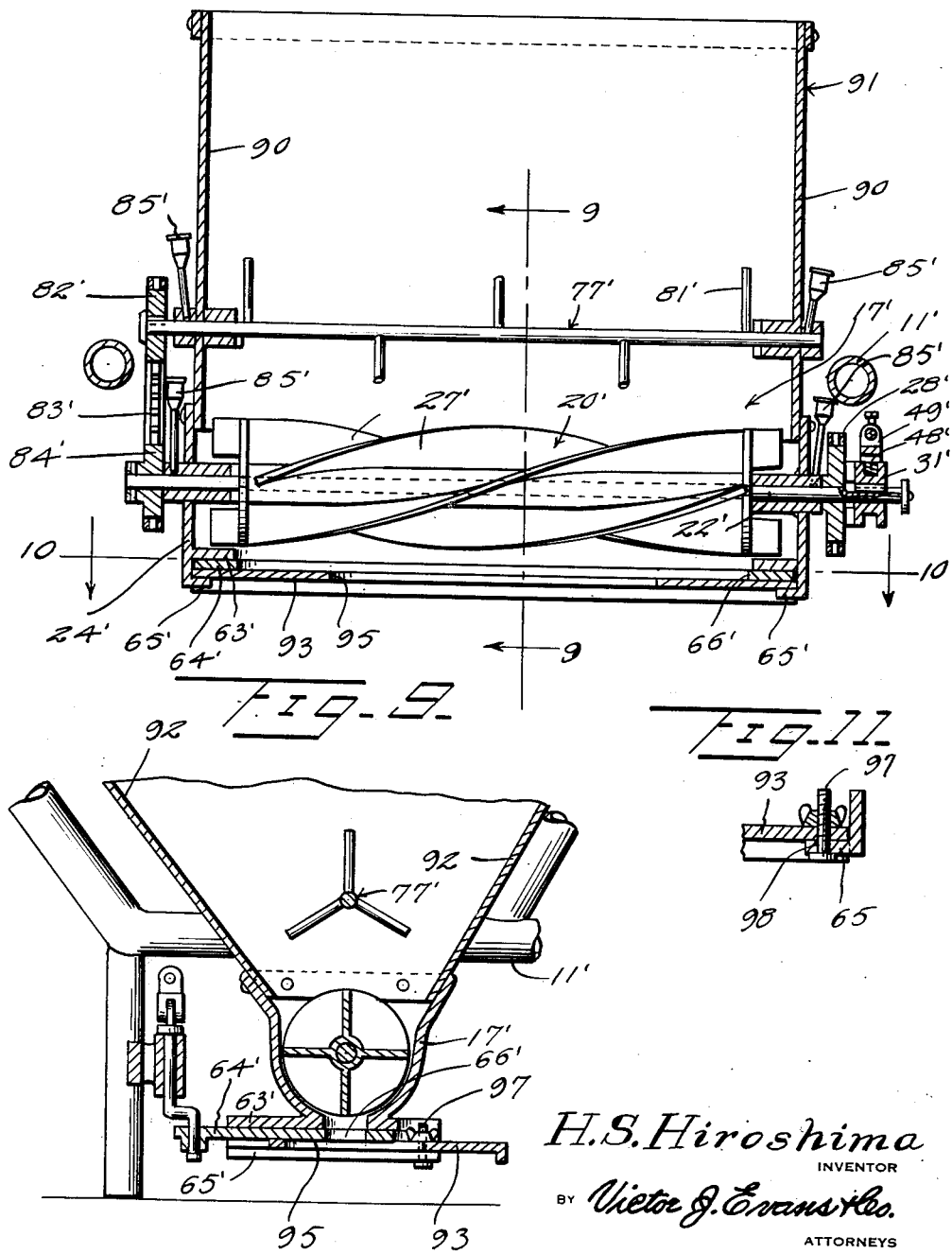

Patented July 13, 1943

2,323,995

UNITED STATES PATENT OFFICE 2,323,995

SPREADER

Hidekichi S. Hiroshima, Culver City, Calif.

Application November 25, 1940, Serial No. 367,108

4 Claims. (Cl. 221—145)

My invention relates to the application of a fertilizer to the soil, particularly in connection with gardens and fields wherein the plants are arranged in rows, and has among its objects and advantages the provision of an improved spreader.

An object of my invention is to provide a manually portable spreader designed to facilitate the application of fertilizer to the soil, and in which novel means are incorporated for regulating the amount of fertilizer applied to the soil.

A further object is to provide a fertilizer in the nature of a manually portable vehicle provided with a hopper having an outlet for the fertilizer, in which a positively driven feeder device is associated with the outlet, and in which the outlet may be controlled to vary the amount of fertilizer passing therethrough, in addition to regulating the width of the outlet opening so as to control the lateral spread of the application.

A further object is to provide a manually portable spreader particularly adapted to the application of fertilizer to the soil having plants arranged in row formation, in which the spreader is provided with an outlet which may be controlled to deliver fertilizer to the soil between the rows only to prevent application of fertilizer to the plants.

In the accompanying drawings:

Figure 1 is a side elevational view of the spreader;

Figure 2 is a top plan view;

Figure 3 is a sectional view taken on the line 3—3 of Figure 2;

Figure 4 is a sectional view taken on the line 4—4 of Figure 1;

Figure 5 is a view taken on the line 5—5 of Figure 3;

Figure 6 is a sectional view taken on the line 6—6 of Figure 1;

Figure 7 is a sectional view taken on the line 7—7 of Figure 1;

Figure 8 is a sectional detail view of a modified form of outlet wherein means are provided for varying the width of the outlet for applying fertilizer to the soil having plants arranged in row formation of variable spacing;

Figure 9 is a sectional view on the line 9—9 of Figure 8;

Figure 10 is a view taken on the line 10—10 of Figure 8;

Figure 11 is a sectional detail view taken on the line 11—11 of Figure 10;

Figure 12 is a plan view of one of the opening control plates of the outlet structure of Figures 8–11, and Figure 13 is a detail view of a portion of a drive clutch actuating mechanism employed in both forms of the invention.

In the embodiment selected to illustrate the invention, a hopper 10 is mounted on a frame 11 supported at its forward end by a wheel 12 and fashioned with handle bars 13 through the medium of which the vehicle is pushed across the field. Fig. 2 illustrates the hopper 10 as being rectangular in configuration when viewed from the top. The side walls 14 and the end walls 15 may comprise sheet metal appropriately secured one to the other, as by welding, and the hopper is reinforced about its upper margin by a metal frame 16. The side and end walls 14 and 15, respectively, converge downwardly and are riveted to a magazine 17 having an outlet opening 18 in its bottom.

Frame 11 may be formed of tubular stock for the sake of strength and light weight, and the end walls of the hopper 10 may be welded to the frame, as at 19 in Fig. 1. Inside the magazine is positioned a rotary feeder 20, and the forward and rear walls of the magazine are curved in part, as at 21, to conform to the curvature of the outside diameter of the feeder 20, which feeder rotates in close proximity to the outlet opening 18. The feeder 20 comprises a rotary shaft 22 supported in bearings 23 carried by the end walls 24 of the magazine 17, see Fig. 4.

Upon the shaft 22 is fixedly secured a sleeve 25 provided with arms 26 to which are secured spirally contoured blades 27 arranged to sweep across the outlet opening 18 through rotation of the shaft 22. To one end of the shaft 22 and exteriorly of the magazine 17 is mounted a sprocket 28. In Fig. 7, the sprocket 28 is provided with a bore 29 which fits loosely on the shaft 22. The sprocket 28 is located on the shaft 22 outwardly of the right hand bearing 23, and it contacts with the outer face of said bearing. This bearing 23, and a pin 30 passing transversely through the shaft 22 and contacting with the outer side of the sprocket 28, hold the sprocket against axial movement with relation to the shaft while permitting it to rotate freely on the shaft.

Adjacent the sprocket 28 and splined to the shaft 22 is a collar 31. The sprocket 28 and collar 31 are provided with mutually engageable clutch dogs 32. The collar 31 is keyed to the shaft 22 for rotation therewith but may be moved longitudinally thereon relative to the sprocket 28 for engaging and disengaging its dogs 32 from the same dogs on the sprocket 28. The sprocket 28 will idle on the shaft 22 when the collar 31 is moved a short distance on the shaft 22 away from the sprocket, but engagement of the dogs on the collar with the same dogs on the sprocket fixedly connects the sprocket 28 with the shaft 22.

Rotary motion is imparted to the sprocket 28 through the medium of a chain 33 passing around a sprocket 34 rotated through turning of the wheel 12 when the spreader is moved across the field. The wheel 12 may be of the inflatable tire type, and its disc 35 is fixedly secured to a shaft 36 supported by bolts 37 actuated by arms 38 welded to the frame 11. Fig. 6 illustrates the construction of one of the arms 38, both being of the same construction, the description of one will apply to both.

The arm 38 is provided with a slot 39 through which the bolt 40 extends. The eye 41 of a bolt 42 is mounted on the bolt 40 between the arm 38 and the head 43 of the bolt. A right-angular lug 44 is formed at the end of the arm 38 and is provided with an opening 45 through which the bolt 42 extends loosely, with the bolt provided with a lock nut 46. Bolt 40 constitutes a shaft for one end of the shaft 36 and the arm 38 constitutes a bearing for the bolt 40. Adjustment of the bolt 40 longitudinally of the slot 39 determines the amount of slack in the chain 33, and the bolt 42 may be adjusted to shift the bolt 40 for taking up slack incident to wear of the chain.

Collar 31 is provided with a circumferential groove 47, see Fig. 7, and a U-shaped member 48 is fitted loosely in the groove. In Fig. 13, a U-shaped member 49 fits over the U-shaped member 48 and is pivotally connected therewith through the medium of bolts 50. A shaft 51 has one end positioned in a bore 52 in the head 53 of the member 49 and is fixedly secured therein by a set screw 54. In Fig. 1, shaft 51 is rotatably supported by a bearing 55 secured to one of the magazine end walls 24.

Shaft 51 is operatively connected with a shaft 56 through the medium of a universal joint 57, and the shaft 56 extends rearwardly alongside one of the handle bars 13 and has its rear end rotatably supported in a bearing 58 secured to the handle bar. Each handle bar is provided with a grip 59, and the shaft 56 is provided with a right-angular handle 60 adjacent the grip 59 of its respective handle bar 13 so as to be within easy reach of the operator.

A tension spring 61 has one end connected with the handle 60 and its other end connected with a lip 62 fixed to the bearing 58, which spring normally supports the handle 60 in the upright position of Fig. 1, at which time the dogs on the collar 31 are in mesh with the same dogs on the sprocket 28. A slight turn of the handle 60 in a clockwise direction by the thumb of the hand grasping the adjacent handle bar grip 59 will impart pivotal movement to the U-shaped member 49, which in turn shifts the collar 31 on the shaft 22 for disengaging the clutch. U-shaped member 49 is loosely fitted in the groove 47 so as to provide accommodation for pivotal movement of the U-shaped member 49.

Magazine 17 includes a plate 63 at its bottom and a slidable plate 64 lies underneath the plate 63 and is slidably guided thereagainst by reason of flanges 65 projecting inwardly of the two end walls 24 of the magazine. An opening 66 is provided in the plate 64, and the plate may be shifted to bring the opening into full or partial registration with the opening 18. Adjustment of the plate 64 is accomplished through the medium of a crank 67 fitting loosely in a slot 670 in the plate 64. Crank 67 is fashioned at one end of a shaft 68 rotatably supported in a bearing 69 secured to a cross brace 70 between the two legs 71, the upper ends of which are welded to the frame 11. The legs 71 are so spaced as to support the spreader in an upright position on the wheel 12.

The upper end of the shaft 68 is operatively connected with a shaft 72 through the medium of a universal joint 73, and the upper end of the shaft 72 is rotatably supported by a plate 74 secured to the upper margin of one of the end walls 15. At the upper end of the shaft 72 is fashioned a crank 75 to facilitate turning of the shaft and adjustment of the plate 64. Fig. 2 illustrates the plate 74 as being provided with numbered graduations 76 across which the crank 75 sweeps. Thus the crank may be aligned with a selected graduation to determine a predetermined degree of registration between the opening 66 in the plate 64 and the opening 18 in the magazine 17. Plate 64 may be adjusted to bring the opening 66 out of registration with the opening 18 so as to completely close the magazine.

Figs. 2, 3 and 4 illustrate an agitator 77 inside the hopper 10, which agitator comprises a shaft 78 rotatably supported in bearings 79 attached to the vertical side walls 80 of the hopper 10, which side walls constitute continuations of the side walls 14. Agitating pins 81 project radially from the shaft 78 and a sprocket 82 is keyed to the shaft exteriorly of the hopper.

Agitator 77 is rotated through the medium of a chain 83 which passes around the sprocket 82 and a sprocket 84 keyed to the end of the shaft 22 opposite the sprocket 28 and exteriorly of the magazine 17. Bearings 23 and 79 are provided with grease cups 85 for lubricating their respective shafts 22 and 78. Agitator 77 maintains the fertilizer in the hopper in a loosened condition so as to insure a good supply to the feeder 20.

In Figs. 8 through 12, I illustrate a spreader embodying a modified feeder outlet structure and a hopper having a wider bottom, but the remaining structure is identical with that illustrated in Figs. 1 through 7 and 13 so that like parts will be similarly numbered in both forms. According to Figs. 8 and 9, the side walls 90 of a hopper 91 are parallel from top to bottom but the end walls 92 are arranged in converging relation and all of the walls are connected with the magazine 17'. Underneath the plate 64' is positioned a width regulating plate 93 which is held against the plate 64' by the flanges 65', and the plate 64' is slidable between the plate 63' and the plate 93. Fig. 12 illustrates the plate 93 as being provided with a series of openings 94 along its two end margins, and the plate is provided with an outlet opening 95 of trapezoidal configuration.

The opening 66' in the plate 64' overlies the opening 95 in the plate 93 so that the material flowing through the opening 95 must first pass through the opening 66'. The converging edges 96 defining two sides of the opening 95 are located adjacent the end walls 24' of the magazine 17' so that the width of the outlet opening 66' may be varied through adjustment of the plates 64' and 93 relative to each other.

The plate 93 may be fixedly secured in different positions through the medium of bolts 97 which may be selectively inserted through the openings 94 and through openings 98 in the flanges 65'. Edges 96 converge in a considerable degree so that slight relative shifting between the plates 64' and 93 will change the width of the effective outlet area of the opening 66'. Thus the width of the band of fertilizer applied to the soil may be effectively controlled with respect to the spacing between the plant rows. Many types of commercial fertilizer have chemical properties which harm the plants when applied directly thereto. For this reason it is important that the fertilizer be applied directly to the soil and not scattered on the plants. The edges 96, which intercept the opening 66' in the plate 64', provide an effective means for varying or shortening the uncovered length of the opening 66' so that the band of applied fertilizer may be accurately controlled for width.

In both forms, the magazines 17 and 17' are spaced relatively close to the ground surface so as to prevent wind currents from unduly scattering the fertilizer.

I claim:

1. A portable spreader, comprising a wheel supported frame, a hopper carried by the frame and having an outlet opening, a driven rotary feeder above the outlet opening, a plate below the hopper and having a slot corresponding to the opening in the hopper, means for shifting said plate to vary the width of the outlet opening, or completely closing the same, a second plate below the first mentioned plate and having an opening of progressively narrowing width, and means for adjustably holding said second plate whereby the length of the discharge opening in the first plate may be varied by a transverse movement of the second plate.

2. A portable spreader, comprising a wheel supported frame, a hopper carried by the frame and having an outlet opening extending transversely thereof, a driven rotary feeder above the outlet opening, a plate below the hopper and having a slot corresponding to the opening in the hopper, means for shifting said plate to vary the width of the outlet opening, or completely closing the same, an adjustable second plate sliding below the first mentioned plate and having an opening with obliquely arranged ends, and means for adjustably holding said second plate, whereby the length of the discharge opening in the second plate may be varied by a transverse movement of the second plate.

3. A portable spreader, comprising a wheel supported frame, a hopper carried by the frame and having an outlet opening extending entirely across the same, a rotary feeder above the outlet opening and driven by the wheels of the frame, a plate below the hopper and having a slot corresponding in size to the opening in the hopper, means for shifting said plate and holding it in its adjusted position to vary the width of the outlet, or completely closing the same, a second plate below the first mentioned plate and having an opening of a width considerably greater than the slot in the first mentioned plate and having obliquely arranged ends, and means for locking said second mentioned plate in its adjusted position, whereby the length of the discharge opening from the hopper may be varied by the transverse adjustment of the second mentioned plate.

4. A portable spreader, comprising a wheel supported frame, a hopper carried by the frame and having an outlet opening extending entirely across the same, a driven rotary feeder above the outlet opening, a plate engaging the lower end of the hopper and having a slot corresponding in size to the outlet opening of the hopper, means for shifting said plate transversely of the outlet opening of the hopper for varying the width of the opening, or completely closing the same, a second plate below the first mentioned plate and having an opening of a greater width than the opening in the first mentioned plate and provided with obliquely arranged ends, bolts for locking said second mentioned plate in its adjusted position, whereby the length of the discharge opening from the hopper may be varied by the transverse adjustment of the second mentioned plate.

HIDEKICHI S. HIROSHIMA.